United States Patent Office 3,415,658
Patented Dec. 10, 1968

3,415,658
STORAGE-STABLE COOKING AND SALAD OILS HAVING ANTISPATTERING PROPERTIES
Robert G. Cunningham, Shaker Heights, Robert D. Dobson, Greenhills, Louis H. Going, Deerfield Township, Warren County, and Edward R. Purves, Forest Park, Ohio, assignors to The Procter & Gamble Company, Cincinnati, Ohio, a corporation of Ohio
No Drawing. Filed Dec. 29, 1965, Ser. No. 517,450
6 Claims. (Cl. 99—163)

ABSTRACT OF THE DISCLOSURE

Storage-stable, antispattering cooking and salad oil composition containing as an active antispattering agent from about 0.1% to about 1.0%, by weight of the total composition of acid-treated unsaturated fatty acid (having about 14 to 18 carbon atoms) monoester of polyoxyetheylene sorbitan containing an average of about 20 oxyethylene units per molecule; and from about 20% to about 100%, by weight of said antispattering agent, of unsaturated fatty acid (having about 14 to 18 carbon atoms) polyester of polyglycerol having an average of from about 4 to about 6 glycerol units, the average ratio of free hydroxyl groups to fatty acid ester groups being from about .16 to not more than 1.0.

---

This invention relates to an improved cooking and salad oil composition having antispattering properties. More particularly, this invention relates to a storage-stable antispattering cooking and salad oil containing small amounts of monoesters of polyoxyethylene sorbitan and long-chain unsaturated fatty acid; and, polyesters of polyglycerol and long-chain unsaturated fatty acids. The presence of these two ingredients in the cooking and salad oils of this invention provides antispattering oil compositions having better storage characteristics than oils containing only unsaturated fatty acid monoesters of polyoxyethylene sorbitan; the oils tend to remain more active over prolonged storage period.

Liquid vegetable oils such as cottonseed oil, soybean oil, corn oil and olive oil are generally used as cooing and salad oils. In preparing green salads a liquid cooking or salad oil is used to provide an oil coating on the basic ingredients of the salad. A solid fat or plastic shortening is not well suited for this purpose. Liquid oils are also preferred over solid fats and plastic shortenings for many cooking tasks; for example the frying of potatoes, fish, eggs, and meat products such as cube steaks, minute steaks, and the like. In the deep frying of food products such as doughnuts, potatoes, and potato chips, liquid oils are frequently used. Liquid oils are also used in the preparation of salad dressings and mayonnaise where the consistency and stability of the final product is often adversely affected by solid or plastic fats or shortenings.

Many foods which are prepared by frying in liquid oil have a high moisture content. In pan frying these foods (especially during the early stages of frying), the contact between the relatively cool water in the food and the hot liquid oil in the cooking pan vaporizes the water into steam which in turn causes the hot oil to spatter. It is a common experience to have hot oil spatter from a frying pan when minute steaks, particularly frozen steaks, are placed in a frying pan containing hot oil. The spattered oil is messy; in addition, it can cause minor burns unless care is exercised during the frying operation.

A number of different substances have been suggested as antispattering agents to either inhibit or retard spatter during the frying of foods. Some of these substances are particularly useful in products which are oil-in-water emulsions, such as margarine, wherein they tend to reduce the oil spatter caused by the sudden breakdown of the emulsion when the emulsion is heated. Unless margarine contains an emulsifying agent, the application of heat causes the oil-in-water emulsion to break down and release large droplets of water. The sudden escape of steam from these droplets expels hot fat particles with sufficient explosive force to cause the fat to spatter. This phenomenon can be observed when margarine is heated in a pan before the addition of any food to the pan. The sodium sulfoacetate derivatives of mono- and diglycerides and other substances such as, for example, those described in U.S. Patents 1,917,249 through 1,917,260, inclusive, are typical margarine antispattering agents. Other antispattering agents for margarine and margarine type emulsion products are described in U.S. Patents 3,006,772 and 3,015,566.

The present invention is concerned with spattering caused by the moisture contained in food products rather than the water contained in emulsions. Spattering caused by contact between cold, moist food and hot frying fat presents a problem the solution to which is unrelated to the solution of the problem of spattering caused by the sudden breakdown of an emulsion and the accompanying release of water. The ordinary emulsifying agents which are useful in margarine and in various cooking and baking shortenings do not possess the antispattering properties deisred for cooking and salad oils, particularly, clear oils. Antispattering agents which are useful in all-purpose plastic shortenings, such as the sorbitol esters of long-chain fatty acids described in U.S. Patent 3,138,463, are not well suited for cooking and salad oils where clarity is an important characteristic.

The co-pending application of Purves, Going and Dobson, U.S. Ser. No. 517,419, filed concurrently herewith, describes and claims an antispattering cooking and salad oil containing small amounts of monoesters of polyoxyethylene sorbitan and long-chain unsaturated fatty acids. According to the present invention, the storage stability of the cooking and salad oils disclosed in the co-pending application is improved by the addition of certain polyesters of polyglycerol (polyglycerol esters). The improved storage stability of the present cooking and salad oils results from an improvement in the dispersion of the active antispattering agent, the monoesters of polyoxyethylene sorbitan, in the oil. In combination with certain polyglycerol esters, the antispattering agent remains uniformly dispersed in the oil for prolonged storage periods; for example, up to about six months. Without the polyesters of polyglycerol, the antispattering agent tends to settle from the oil composition during extended storage. This settling lessens the antispattering activity of the oil fraction from which the antispattering agent has settled.

Accordingly, it is a primary object of this invention to provide a storage-stable cooking and salad oil composition having a reduced tendency to spatter during the frying of moist foods.

It is another object of this invention to provide a clear antispattering cooking and salad oil composition which maintains its activity for extended storage periods because its active antispattering agent remains uniformly dispersed in the oil.

It is still a further object of this invention to provide a storage-stable, antispattering cooking and salad oil which is also useful for the preparation of stable salad dressings and mayonnaise.

Briefly stated, the cooking and salad oil composition of this invention comprises a clear, liquid glyceride base oil containing as an active antispattering agent from about 0.1% to about 1.0% by weight, and preferably from about 0.125% to about 0.3%, by weight, of the total composition, of unsaturated fatty acid monoester of polyoxyethylene sorbitan containing an average of about 20 oxyethylene units per molecule, said fatty acid having from about 14 to about 18 carbon atoms; and, from about 20% to about 100%, by weight of the active antispattering agent, of unsaturated fatty acid polyester of polyglycerol having an average of from about 4 to about 6 glycerol units, the average ratio of free hydroxyl groups to fatty acid ester groups, being from about .16 to not more than 1.0, said fatty acid having from about 14 to about 18 carbon atoms.

The polyglycerol molecule has the following structure:

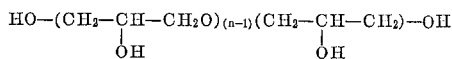

When this molecule is esterified the two terminal hydroxyl groups are not affected; however, esterification can take placed at all other hydroxyls. The ratio of free hydroxyl groups to the fatty acid ester groups is determined by dividing the two terminal hydroxyl groups plus the total number of polymer units which can be esterified ($n$) minus those actually esterified by the number of fatty acid ester groups. For example, the polyglycerol ester, "decaglycerol decaoleate," often referred to as 10–10–0, has two terminal hydroxyl groups and ten fatty acid ester groups or a ratio of free hydroxy groups to fatty acid ester groups of .2. Another polyglycerol ester, "decaglycerol tetraoleate," often referred to as 10–4–0, has a ratio of free hydroxyl groups to fatty acid ester groups of 2.0 determined as follows: two terminal hydroxyl groups plus ten polymer units minus four esterified units divided by the four fatty acid groups. As a further example, the ratio of free hydroxyl groups to fatty acid ester groups in hexaglycerol tetaroleate is 1.0.

It is known that certain general classes of materials such as the sorbitan partial esters and the polyoxyethylene ethers of sorbitan partial esters, respectively, have useful emulsifying properties for plastic and liquid shortenings. For example, the sorbitan esters are disclosed in U.S. Patents 2,303,432 and 2,322,820–1, and their polyoxyethylene derivatives are disclosed in U.S. Patent 2,380,-166. The use of these compounds and other types of materials for emulsifying purposes in opaque liquid shortenings for cake baking is described in U.S. Patents 2,746,868, 2,968,562–4, and 3,117,010. These patents teach broad classes of materials and broad ranges of concentrations for these materials. It was not previously known that the particular esters described in this invention are useful in amounts of from about 0.1% to about 1.0%, by weight, of a clear, liquid glyceride base oil to impart antispattering properties to the oil.

In accordance with the present invention it is essential that the antispattering agent which imparts the antispattering properties to the cooking and salad oils be a monoester as distinguished from di-, tri-, or higher partial or complete ester. It is also essential that the fatty acid portion of the monoester contain from about 14 to about 18 carbon atoms and that it be derived from predominantly unsaturated fatty acids as distinguished from saturated fatty acids. Examples of suitable unsaturated fatty acids for this purpose are myristoleic, palmitoleic, oleic and linolenic acids. The saturated monoesters such as polyoxyethylene sorbitan monostearate and the more fully esterified products such as polyoxyethylene sorbitan tristearate destroy the clarity of the liquid base oil of the cooking and salid oil compositions at low storage temperatures.

As previously indicated, it is preferred that the level of the antispattering agent be from about 0.125% to about 0.3%, by weight, of the cooking and salad oil composition. At levels above about 0.3%, by weight, the composition develops whath as been described by some taste experts as an "off-flavor." For some persons, this "off-flavor" is not detectable at levels up to about 0.5%, by weight.

Therefore, the preferred concentration of the antispattering agent can be extended to about 0.5%, by weight, of the composition.

Certain broad classes of polyglycerol esters of fatty acids are known to have useful emulsifying properties in shortenings and antispattering proporteries in margarine. The use of polyglycerol esters of fatty acids in shortenings and cake batters is disclosed in U.S. Patents 2,022,766, 2,023,388, 2,024,356, 2,033,195, 2,132,417, and in an article in 37, Baker's Digest, No. 5, p. 72–5 (October 1963). The use of these esters as antispattering agents for margarine is disclosed in U.S. Patents 2,023,388, 2,132,417 and 2,223,558. U.S. Patent 2,266,591 teaches that polyglycerol esters can be used to retard the deposition of stearine from salad oil at low temperatures such as temperatures below 32° F.

It has been previously stated that in the present invention it is essential to the storage stability of the antispattering cooking and salad oils that hte polyester of polyglycerol which is the storage-stabilizing agent have an average of about 4 to about 6 glycerol units per molecule as distinguished from polyglycerol esters having an average of fewer or substantially more glycerol units, for example 2 or 12 units, respectively. The polyglycerol ester must also have an average ratio of from about .16 to not more than 1.0 free hydroxyl groups for each fatty acid ester group. The fatty acid ester groups contain from about 14 to about 18 carbon atoms and are derived from predominantly unsaturated as distinguished from saturated fatty acids. Examples of suitable unsaturated fatty acids for this purpose are myristoleic, palmitoleic, oleic, linoleic, and linolenic acids. Saturated esters derived from acids such as palmitic and stearic acids and the mote completely esterified polyglycerol esters such as tetraglycerol trimyistate do not have the storage-stabilizing properties of the polyglycerol esters which are useful in this invention.

In order to insure the clarity of the compositions of this invention, it is essential that the liquid glyceride base oil be substantially free of general purpose shortening emulsifiers such as mono- and diglyceride esters, lactylated glyceride esters, and any other materials which might tend to cloud the base oil or otherwise interfere with its clarity. The use of substances which are fluidizers, for example, aluminum tripalmitate, reduce the antispattering characteristics of the cooking and salad oil compositions; their use should also be avoided.

A wide variety of liquid glyceride base oils can be used in the cooking and salad oil compositions of this invention. Included among suitable oils are the so-called natural salad oils such as, for example, olive oil, sunflower seed oil, safflower oil, and sesame seed oil. Other naturally-occurring liquid glyceride oils such as, for example, cottonseed oil and corn oil, are also useful; these oils are given a preliminary "winterizing," de-waxing, or similar treatment to remove the higher melting stearins before being used as a base oil. Certain other oils such as, for example, soybean oil, can be partially hydrogenated before use to improve their resistance to oxidative deterioration during prolonged storage periods; the higher melting solids formed during the hydrogenation treatment are preferably removed by winterization.

Suitable clear liquid glyceride base oils also can be obtained by directed, low temperature interesterification or rearrangement of animal or vegetable fatty materials, followed by the removal of the higher melting solids formed during the reaction. For an example of this procedure, see U.S. Patent 2,442,532. Another group of oils suitable for use as the liquid glyceride base oil is that group of oils in which one or more short-chain fatty acids, such as acetic acid and propionic acid, replace, in part, the long-chain fatty acids present in natural triglyceride oils.

Other useful clear liquid glyceride oils can be derived from animal, vegetable and marine sources, including mixtures of various such oils. Particularly preferred oils for use in this invention are cottonseed oil, soybean oil, and mixtures thereof.

According to one aspect of this invention, the polyoxyethylene sorbitan monoester component, prior to its admixture with the clear base oil, is subjected to an acidifying treatment with an acid such as phosphoric acid, sulfuric acid, or hydrochloric acid, or, alternatively, is passed through an acid activated filtering clay such as "Superfiltrol." Although the pure monoester product probably does not exhibit a true pH, since it is essentially free of water, the monoester is preferably treated with acid media so that it ultimately shows a pH of not more than about 7 (preferably between about 6.5 and 7) in the presence of a trace of water when measured by conventional pH indicators, for example, a Beckman pH meter. The term "acid-treated" is used herein to describe the above-described or similar acidifying treatment. "Apparent pH" is used herein to describe the pH of the monoester in the presence of a trace of water either before or after it is "acid-treated."

The following examples illustrate the present invention; however, it is understood that the invention is not limited thereto since other variations will be readily discernible to those skilled in the art after reading the description of the invention. All percentages and proportions in the following examples are by weight rather than volume unless otherwise specified.

Example 1

Five cooking and salad oil compositions were prepared from refined, bleached and deodorized soybean oil partially hydrogenated to an iodine value of about 107 and winterized after hydrogenation. Acid-treated "Tween-80" and "Drewpol 10–10–0" were dispersed in four of the five compositions in the amounts shown in Table I, below, by thoroughly mixing the "Tween-80," the "Drewpol 10–10–0" and the oil for three minutes in a Waring blender. The oil without these additives was used as a control.

"Tween-80" is a commercially-available product which is a mixture of polyoxyethylene sorbitan esters of predominantly monounsaturated oleic acid; it contains an average of about twenty oxyethylene units in the molecule [i.e., polyoxyethylene (20) sorbitan monooleate]. The commercial product has an apparent pH in the presence of a trace of water of about 8. The "Tween-80" used in this example was acid-treated with phosphoric acid (85% solution) to reduce its apparent pH to about 6.5 in the presence of a trace of water when measured with a Beckman pH meter. The acid treatment was carried out by first heating the "Tween-80" to about 145° F. in a stainless steel bowl to reduce its viscosity before adding the amount of acid calculated to lower the pH of the "Tween-80" to the desired level, and slowly stirring the mixture to insure that the acid became uniformly dispersed.

"Drewpol 10–10–0" is a commercial product described by the manufacturer as "decaglycerol decaoleate;" however, it has been determined to be a mixture of polyglycerol esters of predominantly monounsaturated oleic acid. It has individual polyglycerol units ranging from diglycerol to decaglycerol and it has an average degree of polymerization of the glycerol moiety of between 4 and 6 glycerol units per polyglycerol molecule. The average ratio of free hydroxyl groups to fatty acid ester groups is .2.

The five liquid oil compositions were used in frying frozen minute steaks. In each instance, the oil and other material which spattered from the frying pan during frying were collected and weighed in order to determine the amount of spatter reduction achieved with the antispattering oil compared to the control which contained no additive. Frying was done in ten-inch square "Sunbeam" Electric Frypans at 360° F. and 420° F. The lower temperature is the customary frying temperaure for frozen steaks. Frying was also conducted at the higher temperature in order to demonstrate the improved spatter reduction under very vigorous frying conditions. In carrying out each frying sequence, a frozen minute steak (75 grams) was placed in the center of a frying pan in which the oil (30 grams) had been heated to the test temperature. The steaks were fried for two and one-half minutes on each side. The oil and other material which spattered from the frying pan during frying were collected on a three foot by three foot square sheet of aluminum foil placed centrally under the frying pan. The amount of spattering was determined by the difference in the weight of the original foil and the foil with spattering. Table I indicates the grams of spatter and the percentage of spatter reduction obtained with the various samples versus the control.

TABLE I

| "Tween-80" weight percent concentration | "Drewpol 10-10-0" weight percent concentration | Frying at 360° F. | | Frying at 420° F. | |
|---|---|---|---|---|---|
| | | Grams of spatter | Percent spatter reduction | Grams of spatter | Percent spatter reduction |
| 0 | 0 | 6.12 | --------- | 7.51 | --------- |
| 0.125 | 0.025 | 1.86 | 69 | 3.66 | 51 |
| 0.1875 | 0.0375 | 1.55 | 75 | 2.69 | 64 |
| 0.250 | 0.050 | 0.93 | 85 | 2.03 | 73 |
| 0.50 | 0.10 | 0.48 | 92 | 1.22 | 84 |

Substantially similar antispatter activity as that shown in Table I is achieved when the amount of polyglycerol ester, "Drewpol 10–10–0," is increased to about 100% by weight of the antispattering agent.

The cooking and salad oil compositions containing "Tween-80" and "drewpol 10–10–0" were clear and remained clear even after prolonged storage, i.e., a period of time exceeding about six months. Similar compositions containing the same amounts of "Tween-60" (polyoxyethylene sorbitan monostearate) and "Drewpol 10–10–0" will become cloudy when stored at 40° F. and 32° F. for short periods of time. Compositions containing similar amounts of "Tween-80" and "Drewpol 10–3–M" in place of "Drewpol 10–10–0" also will become cloudy after prolonged storage. "Drewpol 10–3–M" is described by the manufacturer as decaglycerol trimyristate; it has an average ratio of free hydroxyl groups to fatty acid ester groups of about 3.

Substantially similar spatter reduction and storage stability as that obtained with "Tween-80" and "Drewpol 10–10–0" in the above example is obtained when polyoxyethylene (20) sorbitan palmitoleate is substituted for polyoxyethylene (20) sorbitan oleate and when the corresponding polyglycerol palmitoleate is used in place of the polyglycerol oleate. Refined, bleached, deodorized, and winterized cottonseed oil can be substituted in whole or in part for soybean oil in the above example without materially affecting the results.

Example 2

The storage stability of the antispattering oils of this invention was demonstrated by composing two sets of antispattering compositions. In each instance, refined, bleached, deodorized, and winterized soybean oil having an IV of 107 was used as the base oil. The first set of compositions contained 0.5% dispersed "Tween-80" [polyoxyethylene (20) sorbitan monooleate], the second set contained an equivalent amount of "Tween-80" and 0.1% dispersed "Drewpol 10–10–0." The two sets of compositions were stored in pint bottles for three and six months periods at relatively constant temperatures of 50° F., 70° F. and 90° F. At the end of three months and six months, respectively, certain bottles in each set were randomly selected and divided into a top and bottom fraction of oil without intermingling the two fractions. Any active antispattering agent (i.e., "Tween-80") which settled to the bottom of the composition during the storage period was isolated in the bottom fraction. The two fractions which were taken from the same bottle were used separaely to fry frozen minute steaks at 420° F. in the manner described in Example 1. The results of the frying with each fraction from the same bottles were compared to determine in which samples the bottom fraction had substantially more antispattering activity than the top fraction. Table II, below, shows that the presence in the one set of compositions of the "Drewpol 10–10–0" substantially retarded the deposition of the antispattering agent. The compositions containing both "Tween-80" and "Drewpol 10–10–0" were more storage stable after three and six months storage than the compositions containing only "Tween-80."

TABLE II

| Storage time and temperature | Grams of spatter with oil samples containing 0.5% by weight "Tween-80"—fraction of sample | | Grams of spatter with oil samples containing 0.5% by weight "Tween-80" and 0.1% by weight "Drewpol 10-10-0"—fraction of sample | |
|---|---|---|---|---|
| | Top | Bottom | Top | Bottom |
| 3 months at 50° F | 3.97 | 0.85 | 0.92 | 0.71 |
| 3 months at 70° F | 2.38 | 0.54 | 1.09 | 0.56 |
| 3 months at 90° F | 1.97 | 0.59 | 0.79 | 0.50 |
| 6 months at 50° F | 5.36 | 0.82 | 1.41 | 0.77 |
| 6 months at 70° F | 5.11 | 0.92 | 1.95 | 0.75 |
| 6 months at 90° F | 3.89 | 0.91 | 2.78 | 0.85 |

Substantially the same storage stabilizing effect of the polyglycerol ester is observed when the amount of "Drewpol 10–10–0" is increased up to about 100% by weight of the active antispattering agent. By way of illustration two sets of antispattering compositions were composed using refined, bleached, and deodorized soybean oil having an IV of 107 which had been winterized. The samples contained 0.22% dispersed "Tween-80" [polyoxyethylene (20) sorbitan monooleate] and 0.22% dispersed "Drewpol 10–10–0." One set of compositions was stored in pint bottles for one month at a temperature of 50° F.; the other set was stored at 90° F. In the manner previously described, two fractions were taken from a randomly selected bottle in each set and used separately to fry frozen minute steaks. The grams of spatter with the top fraction of the oil sample stored at 50° F. was 0.99; the grams of spatter with the bottom fraction was 0.76. The results with the top and bottom fractions from the oil sample stored at 90° F. was 1.02 and 0.75 grams of spatter respectively.

Variations and modifications of the present invention can be made upon a study of the foregoing disclosure by those skilled in the art of cooking and salad oils. Such variations and modifications are intended to be within the spirit and scope of the invention as defined in the appended claims.

What is claimed is:

1. A storage-stable cooking and salad oil composition having antispattering properties comprising a clear, liquid glyceride base oil containing as an active antispattering agent from about 0.1% to about 1.0%, by weight of the total composition, of unsaturated fatty acid monoester of polyoxyethylene sorbitan containing an average of about 20 oxyethylene units per molecule, said fatty acid having from about 14 to about 18 carbon atoms, said ester acid-treated to an apparent pH between about 6.5 and 7.0 in the presence of a trace of water; and, from about 20% to about 100%, by weight of said active antispattering agent, of unsaturated fatty acid polyester of polyglycerol having an average of from about 4 to about 6 glycerol units, the average ratio of free hydroxyl groups to fatty acid ester groups being from about .16 to not more than 1.0, said fatty acid having from about 14 to about 18 carbon atoms.

2. The composition of claim 1 in which the unsaturated fatty acid monoester of polyoxyethylene sorbitan is polyoxyethylene (20) sorbitan monooleate.

3. The composition of claim 1 in which the unsaturated fatty acid monoester of polyoxyethylene sorbitan is about 0.125% to about 0.3% by weight of the total composition.

4. The composition of claim 1 in which the liquid glyceride base oil is selected from the group consisting of cottonseed oil, soybean oil, and mixtures thereof.

5. A storage-stable cooking and salad oil composition having antispattering properties comprising a clear, liquid glyceride base oil containing as an active antispattering agent from about 0.125% to about 0.3% by weight of the total composition, of polyoxyethylene (20) sorbitan monooleate acid-treated to an apparent pH between about 6.5 and 7.0 in the presence of a trace of water; and, from about 20% to about 100%, by weight of said active antispattering agent, of unsaturated fatty acid polyester of polyglycerol having an average of from about 4 to about 6 glycerol units, the average ratio of free hydroxyl groups to fatty acid ester groups being from about .16 to not more than 1.0, said fatty acid having from about 14 to about 18 carbon atoms.

6. The composition of claim 5 in which the liquid glyceride base oil is selected from the group consisting of cotton seed oil, soybean oil, and mixtures thereof.

References Cited

UNITED STATES PATENTS 2,023,388 12/1935 Harris _____ 260—410.6
3,355,302 11/1967 Purves et al. _____ 99—163

MAURICE W. GREENSTEIN, *Primary Examiner.*

U.C. Cl. X.R.

99—118, 144